(12) United States Patent  
Shintani et al.

(10) Patent No.: US 12,389,060 B2
(45) Date of Patent: Aug. 12, 2025

(54) FASTER CHANNEL CHANGE TIME SYSTEM FOR ATSC 3.0

(71) Applicant: Sony Group Corporation, Tokyo (JP)

(72) Inventors: Peter Shintani, San Diego, CA (US); Fred Ansfield, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 33 days.

(21) Appl. No.: 18/463,166

(22) Filed: Sep. 7, 2023

(65) Prior Publication Data

US 2025/0088698 A1    Mar. 13, 2025

(51) Int. Cl.
*H04N 21/426*    (2011.01)
*H04N 21/482*    (2011.01)

(52) U.S. Cl.
CPC ....... *H04N 21/4263* (2013.01); *H04N 21/482* (2013.01)

(58) Field of Classification Search
CPC .......................... H04N 21/4263; H04N 21/482
See application file for complete search history.

(56) References Cited

U.S. PATENT DOCUMENTS

| | | | | |
|---|---|---|---|---|
| 2003/0159157 A1* | 8/2003 | Chan | ................ | H04N 21/4532 725/38 |
| 2004/0181813 A1* | 9/2004 | Ota | ................ | H04N 21/4384 348/E5.005 |
| 2008/0086746 A1* | 4/2008 | King | ................ | H04N 21/4263 725/43 |
| 2008/0276288 A1* | 11/2008 | Kim | ................ | H04N 21/4263 348/E5.097 |
| 2008/0297661 A1* | 12/2008 | Kitaguchi | ................ | H04N 21/4263 348/731 |
| 2009/0002570 A1* | 1/2009 | Oki | ................ | H04N 21/4384 348/731 |
| 2010/0186046 A1* | 7/2010 | Bae | ................ | H04N 21/42204 725/56 |
| 2011/0141377 A1* | 6/2011 | Maruyama | ................ | H04N 21/426 348/732 |
| 2011/0307915 A1 | 12/2011 | Yao | | |
| 2014/0189736 A1* | 7/2014 | Kummer | ................ | H04N 21/434 725/39 |
| 2015/0156561 A1* | 6/2015 | McRae | ................ | H04H 60/375 725/14 |
| 2017/0353744 A1* | 12/2017 | Kunisetty | ................ | H04N 21/266 |
| 2018/0091832 A1* | 3/2018 | Zeiler | ................ | H04N 21/8133 |

(Continued)

FOREIGN PATENT DOCUMENTS

| | | | |
|---|---|---|---|
| CA | 2258823 A1 | 7/1999 | |
| WO | 03073754 A1 | 9/2003 | |
| WO | WO-2017145109 A1 * | 8/2017 | ......... H04N 21/4263 |

*Primary Examiner* — Fernando Alcon
(74) *Attorney, Agent, or Firm* — John L. Rogitz; John M. Rogitz (57) ABSTRACT

Faster channel change time in ATSC such as ATSC 3.0 is effected by using the native tuner of a display device to present a currently demanded channel and a second tuner, which can be dongle-based, to tune/scan preemptively in the background based upon heuristics such as usage pattern of the user. If the user is pressing channel-up key using a remote control, the second tuner can be scanning and tuning the next channel in the channel map to preemptively tune to a second channel likely to be desired by the user for immediate presentation of that channel through the second tuner.

20 Claims, 6 Drawing Sheets

(56) References Cited

U.S. PATENT DOCUMENTS

| | | | |
|---|---|---|---|
| 2018/0206001 A1* | 7/2018 | Kim | H04N 21/42204 |
| 2019/0327517 A1* | 10/2019 | Skowronski | H04N 21/4821 |
| 2019/0335225 A1* | 10/2019 | Fang | H04N 21/4131 |
| 2021/0006866 A1* | 1/2021 | Chu | G06N 20/00 |
| 2023/0091730 A1* | 3/2023 | Kalathuru | H04N 21/44209 725/139 |

* cited by examiner

FASTER CHANNEL CHANGE TIME SYSTEM FOR ATSC 3.0

FIELD

The present application relates to technically inventive, non-routine electronic glossary solutions that are necessarily rooted in computer technology and that produce concrete technical improvements, particularly to faster channel change times for ATSC 1.0 or 3.0.

BACKGROUND

Digital TV and in particular digital broadcast TV using the standard known as Advanced Television Systems Committee (ATSC) 3.0 has been introduced to usefully provide broadcast digital TV content to receivers using both terrestrial broadcast transmitters and computer networks.

SUMMARY

As understood herein, compared to analog TV tuning, the tuning speed of digital TV is often slower, potentially due to buffer size, frame periodicity etc. in addition to the complexity of tuning and demodulating a digital TV signal. Specifically with ATSC 1.0 and ATSC 3.0, the channel tuning speed is slower than what most consumers desire. Slow channel tuning makes channel surfing an arduous task. Present principles provide techniques to improve the channel tuning speed, in some cases without impacting the base cost of the TV chassis.

Accordingly, an apparatus includes at least one computer memory that is not a transitory signal and that in turn includes instructions executable by at least one processor assembly to present, using a first tuner, a first digital television (DTV) channel on at least one display device. The instructions also are executable to receive channel browsing signals (CBS) from at least one input device that cause a channel list to be browsed, and responsive to the CBS, cause a second tuner to tune to a second DTV channel. The instructions are executable to, responsive to a channel change command to the second DTV channel, switch to presenting the second DTV channel on the display device using the second tuner.

In example embodiments the input device can include a television remote control (RC) and the display device can include a DTV. In some implementations the display device includes a chassis holding a display, and the first and second tuners are in the chassis. In other implementations the first tuner and no other tuner is in the chassis, and the second tuner is embodied in a dongle plugged into an external port of the chassis.

In example implementations the channel list can include an electronic program guide (EPG) presented on the display device. However the channel list may be embodied, the instructions may be executable to cause the second tuner to tune to the second DTV channel before a listing for the second DTV channel is visible on the channel list.

For an example of how this can be achieved, the instructions can be executable to input the CBS to at least one machine learning (ML) model, and cause the second tuner to tune to the second DTV channel based on output from the ML model. The ML model training may be refined using the CBS.

In another aspect, an apparatus includes at least one processor assembly configured to use a first tuner to present a first digital television (DTV) channel on at least one display device, present a channel list on the display device, receive channel browsing signals to navigate the channel list, and use a second tuner to tune to a second DTV channel responsive to the CBS prior to receiving a channel change command to the second DTV channel.

In another aspect, a method includes presenting, using a first tuner, a first television (TV) channel on at least one display device, receiving channel browsing signals (CBS), navigating a channel list in response to the CBS and responsive to the CBS, causing a second tuner to tune to a second TV channel, and responsive to a channel change command to the second TV channel, presenting the second TV channel on the display device using the second tuner. Note that the tuning of the second tuner may be based upon the direction the user is pressing the channel up or down button. The details of the present application, both as to its structure and operation, can best be understood in reference to the accompanying drawings, in which like reference numerals refer to like parts, and in which:

DETAILED DESCRIPTION

This disclosure relates to technical advances in digital television such as in Advanced Television Systems Committee (ATSC) 1.0 or 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers. A processor assembly may include one or more processors.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"An [element] having at least one of A, B, and C" (likewise "having at least one of A, B, or C" and "having at least one of A, B, C") includes A alone, B alone, C alone, A and B together, A and C together, B and C together, and/or A, B, and C together, etc.

Figure 1:
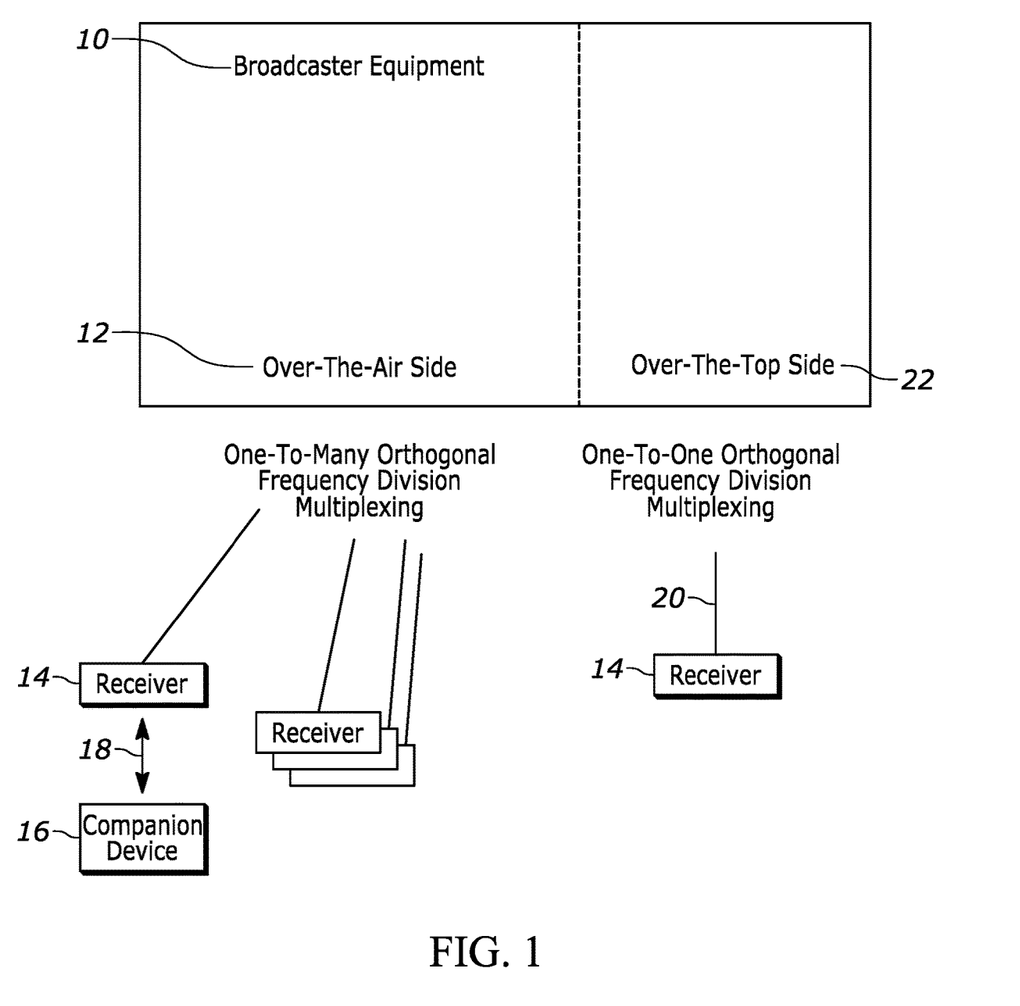
FIG. 1 illustrates an Advanced Television Systems Committee (ATSC) 3.0 system.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. A receiver 14 may have both non-persistent memory 14A such as certain types of solid-state RAM and persistent memory 14B such as flash. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
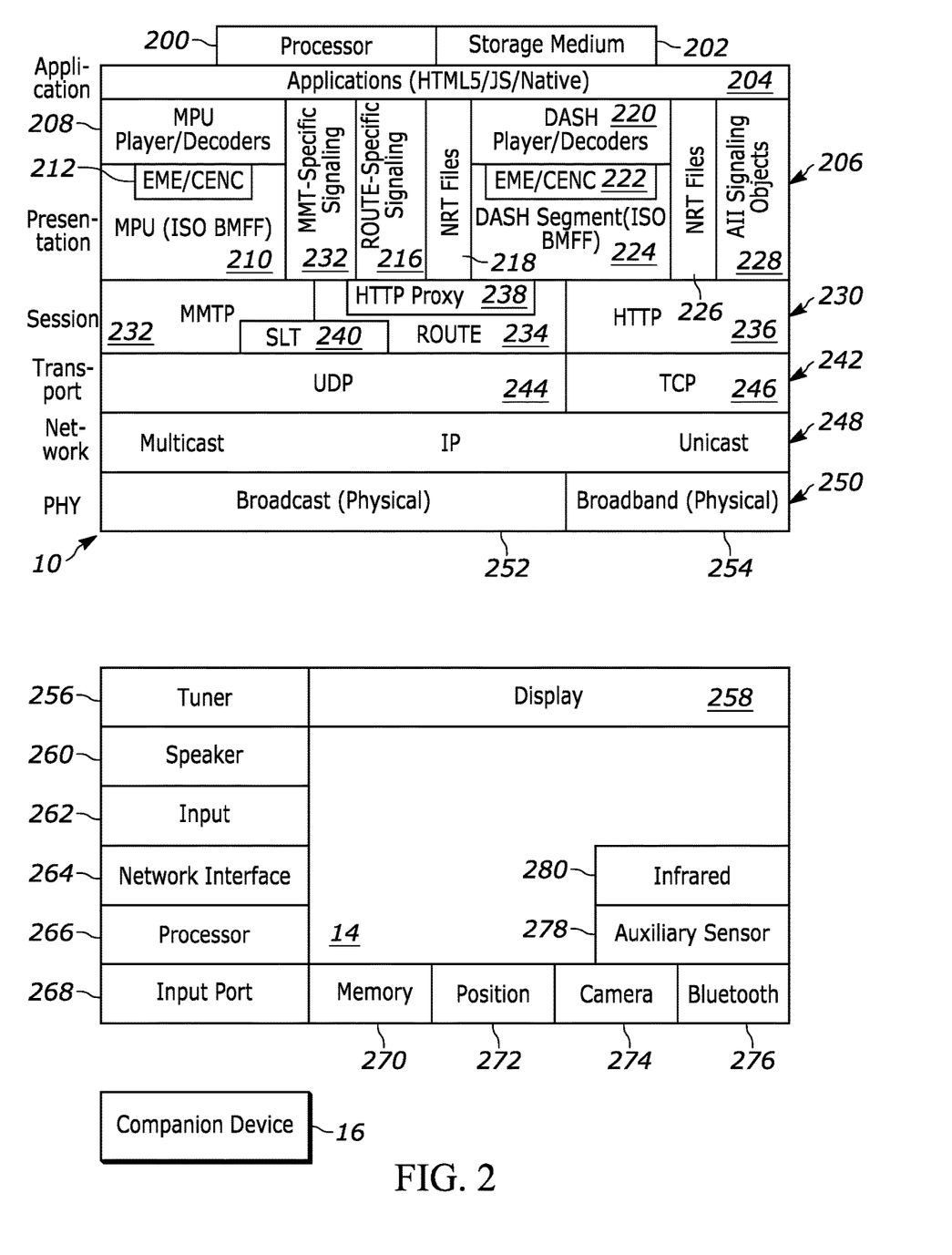
FIG. 2 illustrates components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects, each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing playback signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 may also employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 3:
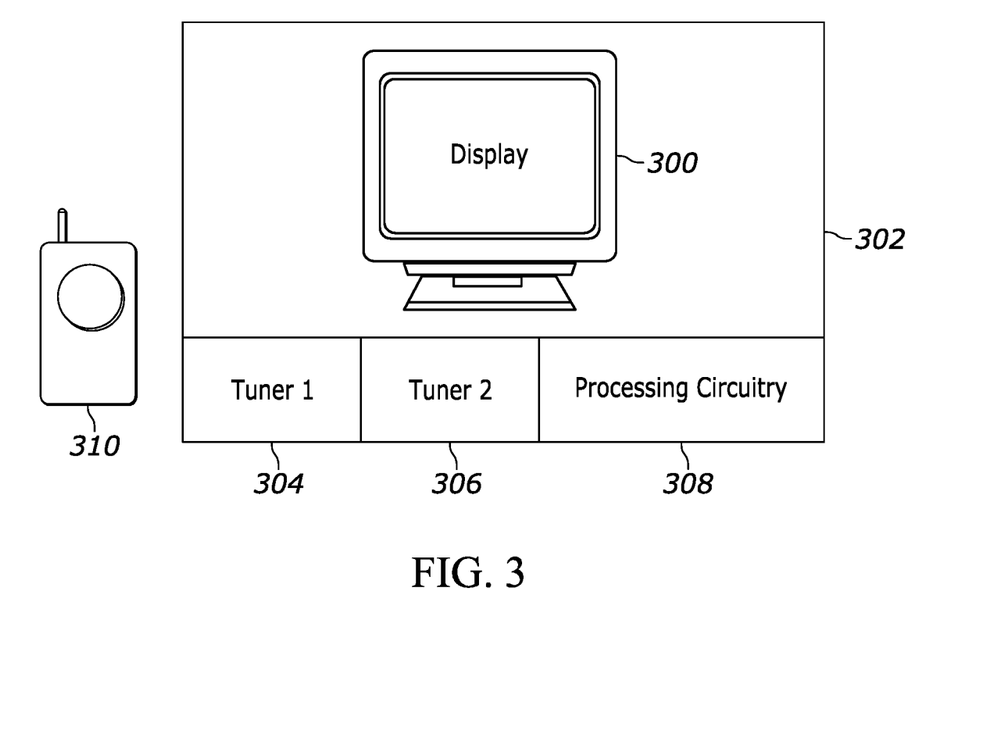
FIG. 3 illustrates a first example system in which a display device has two internal tuners.

Now referring to FIG. 3, a display device 300 such as a digital television (DTV) includes a chassis 302 and first and second DTV tuners 304, 306 inside the chassis 302, controlled by DTV processing circuitry 308 that may receive channel browsing signals (CBS) from an input device 310 such as a remote control (RC) to browse a channel list such as an electronic program guide (EPG) that can be presented on the DTV. The tuners may be external to the chassis.

Figure 4:
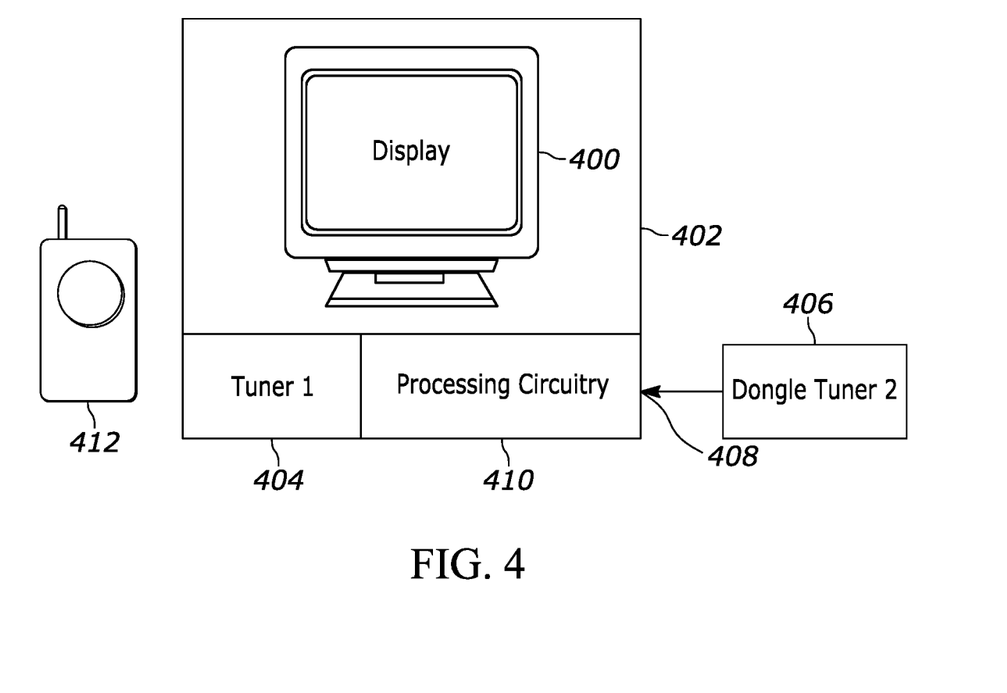
FIG. 4 illustrates a second example system in which a display device has only one internal tuner and is supplied with a second tuner via a dongle.

On the other hand, FIG. 4 shows a display device 400 such as a digital television (DTV) includes a chassis 402 and a first DTV tuner 404 inside the chassis 402. No other tuner is inside the chassis as shown. A second DTV tuner 406 embodied in a dongle can be plugged into an external port 408 of the chassis, such as a universal serial bus (USB) port. The tuners 404, 408 may be controlled by DTV processing circuitry 410 that may receive channel browsing signals (CBS) from an input device 412 such as a remote control (RC) to browse a channel list such as an electronic program guide (EPG) that can be presented on the DTV.

Figure 5:
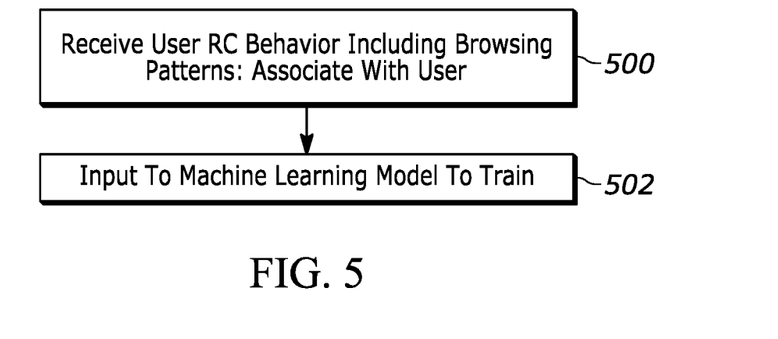
FIG. 5 illustrates example machine learning (ML) training logic consistent with present principles in example flow chart format.
Figure 6:
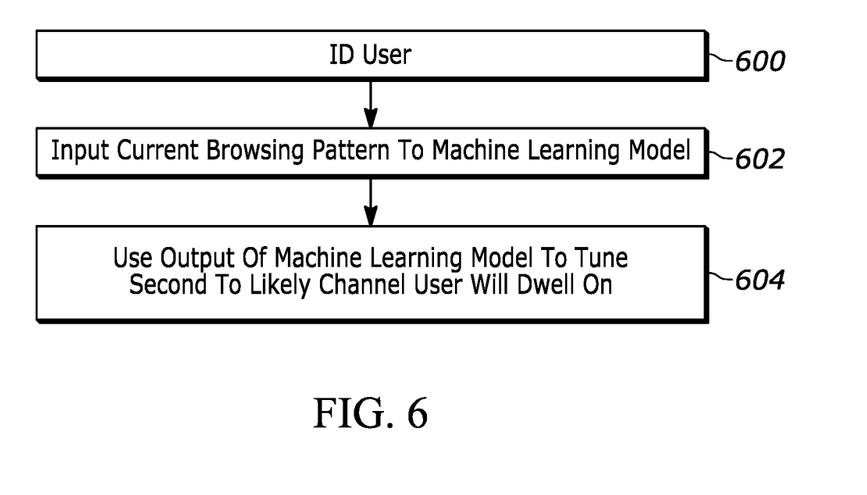
FIG. 6 illustrates example ML use logic consistent with present principles in example flow chart format.
Figure 7:
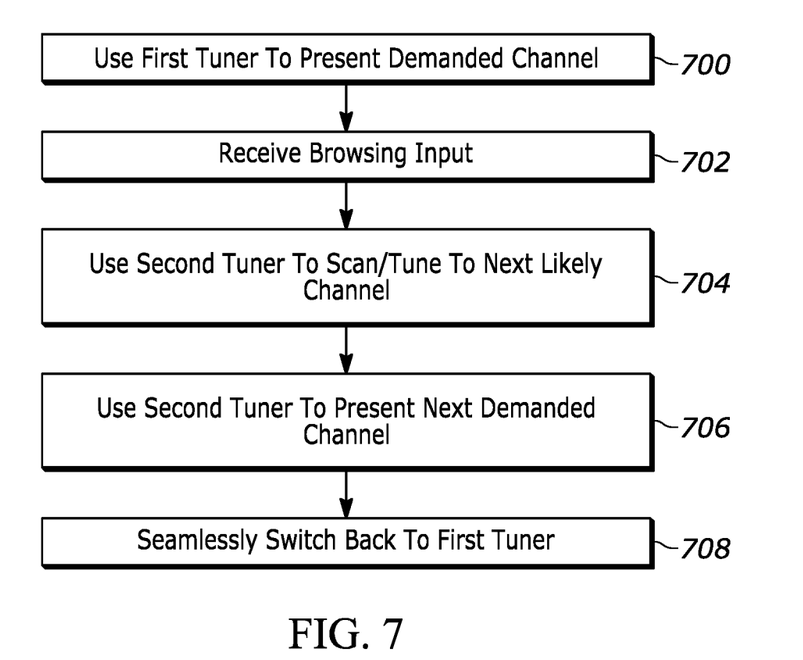
FIG. 7 illustrates example overall logic consistent with present principles in example flow chart format.

Prior to turning to the overall logic of FIG. 7, reference is first made to FIGS. 5 and 6 for an understanding of an example machine learning (ML)-implemented technique, it being understood that non-ML techniques such as the use of heuristics keyed to certain CBS patterns may be used. Commencing at state 500, user browsing behavior is received, such as CBS input by means of one of the RCs shown in FIG. 3 or 4. The user browsing behavior is input at state 502 to at least one ML model to train the model. The user browsing behavior may be segmented by user, who may be identified using face recognition on images from a camera on the DTV or through user login or other techniques, such that the ML model may be trained on a user-by-user basis. In other examples the ML model may be trained on collective user behavior.

FIG. 6 illustrates that after initial training, the ML model may be used to predict a next channel the user may ultimately wish to select based on the user's browsing behavior. The user can be identified at state 600 if desired and the user's current CBS input at state 602 to the ML model while a first channel is being presented on the DTV through the first tuner. At state 604 the ensuing output of the ML model is used to tune the second tuner to a second channel prior to receiving any channel change command (as opposed to CBS) from the RC. Note that the training of the ML model may be further refined based on the CBS received at state 602.

FIG. 7 illustrates further. At state 700 the first tuner of FIG. 3 or 4 is used to present a first channel such as a first DTV channel on at least one display device such as the display device shown in FIG. 3 or 4. As the first channel is being presented, at state 702 channel browsing signals (CBS) are received from at least one input device such as one of the RCs shown in FIG. 3 or 4 that cause a channel list to be browsed. Responsive to the CBS, at state 704 the second tuner such as either of the second tuners shown in FIG. 3 or 4 is caused to tune to a second TV channel prior to the user actually inputting a channel change command. Upon receipt of a channel change command to the second channel, at state 706 the second tuner is used to present, comparatively quickly, the second channel on the TV. The first tuner may then assume the duties of the second tuner in scanning and tuning to yet a third channel, and/or the logic may move to state 708 to seamlessly transition back to using the first tuner this time to present the second channel by tuning the first tuner to the second channel and then transparently switching presentation from the second tuner back to the first tuner. The second tuner may then resume its role of scanning and tuning to subsequent channels upon subsequent receipt of CBS.

Figure 8:
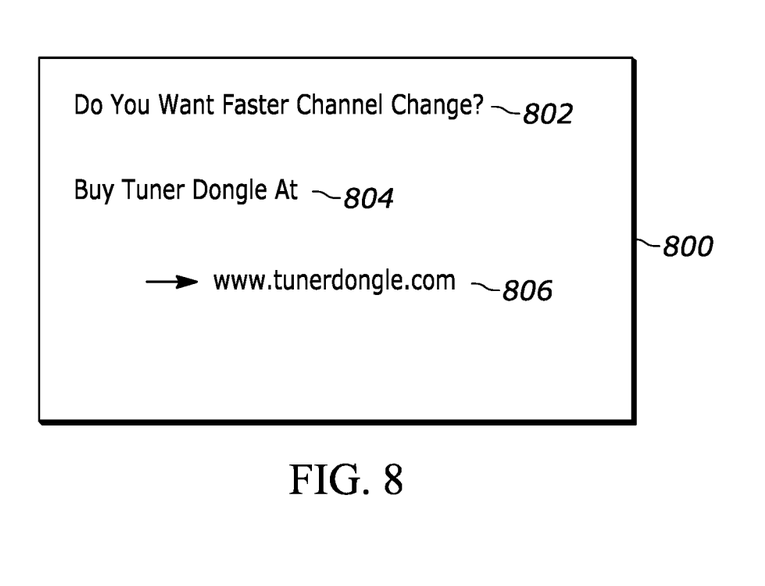
FIG. 8 illustrates an example user interface consistent with present principles.

FIG. 8 illustrates a display 800 such as any display herein that may present a prompt 802 asking if the user wishes for faster channel changes than afforded by the single tuner inside the chassis in the example of FIG. 4. If so, a prompt 804 may be presented for the user to obtain the dingle shown in FIG. 4 and may include a web address 806 at which the dingle may be ordered, along with requisite software loadable into the display processor to allow the processing circuitry to control the display using both tuners as described above. Or, the software may be downloaded from the cloud.

Figure 9:
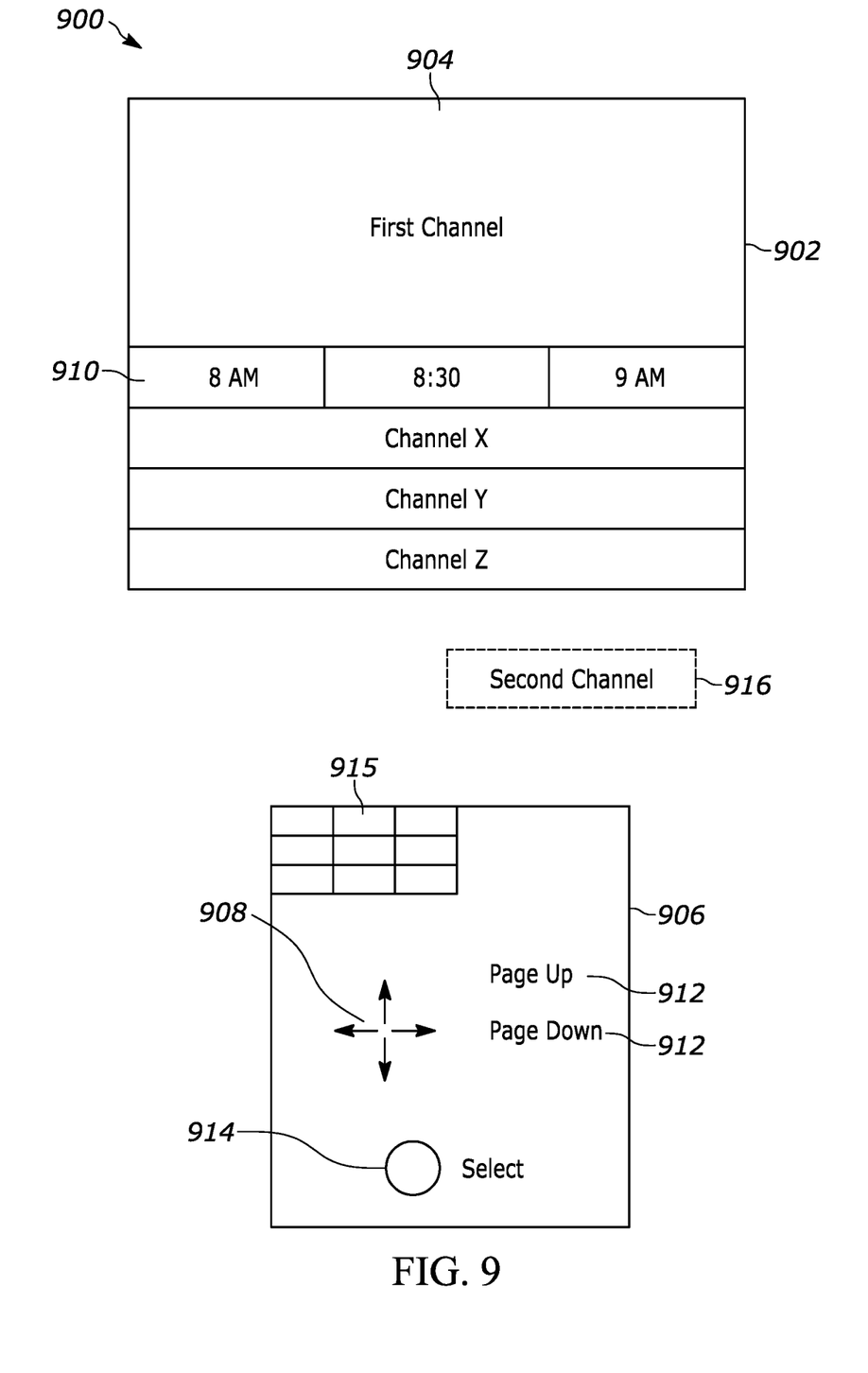
FIG. 9 illustrates a remote control and display device with EPG to show user browsing patterns.

FIG. 9 illustrates an electronic program guide (EPG) 900 presented on a display device 902 such as any display described herein. The EPG may be presented under a currently tuned-to first channel 904 as shown, or overlaid in semi-transparency on the first channel.

A user may browse the EPG 900 using an input device 906 such as a RC. As shown, the input device 906 may include up, down, left, and right arrows 908 to move a cursor in the display up and down the EPG, from individual channel to the next successive individual channel, and left and right on the display, from one tie slice 910 on the EPG to the next. The input device also may include page up and page down selectors 912 to cause the cursor to jump from listing 1 to listing N up or down, respectively, on the EPG, wherein N>1. As the user manipulates the selectors 908, 912 the CBS are generated and used to predict a second channel the user is predicted to tune to based on the browsing behavior. Once the predicted second channel is ascertained, the second tuner is tuned to it prior to receiving a channel change command as may be input, for example, using a select key 914 on the input device and/or by inputting the second channel number directly using a numeric keypad 915 on the input device. In some cases the second tuner may be tuned to the second channel not only prior to a channel change command to the second channel, but also prior to the second channel listing being visible on the EPG, as shown by dashed lines 916 in FIG. 9. Of course, should the user input a channel change command to a channel other than that to which the second tuner is tuned, the first tuner may be used to switch to the channel other than that to which the second tuner is tuned.

Thus, if the user is pressing a channel-up key using a remote control, the second tuner can be scanning and tuning the next channel in the channel map. With respect to the embodiment of FIG. 4, if the user wants to have a faster channel surfing experience, the user can purchase a USB tuner dongle and externally split the RF antenna signal and feed the USB tuner and the internal tuner of the TV. The user would either activate an app or download a multi-tuner application, which would control the two tuners. The USB dongle tuner for all intents and purposes would function as if it were a second internal tuner of the TV.

The second tuner could be used to provide additional picture and picture or picture in picture (PNP/PIP) features to the TV. The second tuner could also potentially be used if ATSC 3.0 (RF) channel bonding broadcasts are available.

There typically are licensing costs for HEVC and ATSC 3.0 demodulation. Regarding the "activation" of the additional ATSC 3.0 demodulator and video decoder, there isn't a cost attached to the dongle if there is no software inside the dongle that makes it operable before being attached to the TV. The TV may have only one video decoder and one ATSC 3.0 decoder. Once the dongle is attached and activated, the additional decoder software for the dongle may be downloaded and royalties adjusted at that time at the manufacturer's data base via the activation process.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
   at least one computer memory that is not a transitory signal and that comprises instructions executable by at least one processor assembly to:
   present, using a first tuner, a first digital television (DTV) channel on at least one display device;
   receive channel browsing signals (CBS) from at least one input device that cause a channel list to be browsed;
   responsive to the CBS, cause a second tuner to tune to a second DTV channel;
   responsive to a channel change command to the second DTV channel, switch to presenting the second DTV channel on the display device using the second tuner;
   while the second DTV channel is presented on the display device using the second tuner, use the first tuner to also tune to the second DTV channel; and
   responsive to the first tuner also tuning to the second DTV channel, switch to presenting the second DTV channel on the display device using the first tuner.

2. The apparatus of claim 1, wherein the input device comprises a television remote control (RC).

3. The apparatus of claim 1, wherein the display device comprises an Advanced Television Systems Committee (ATSC) 3.0 DTV.

4. The apparatus of claim 1, wherein the display device comprises a chassis holding a display, the first tuner being in the chassis, the second tuner being embodied in a dongle plugged into an external port of the chassis, the dongle not containing software until downloaded after the dongle has been being plugged into the external port.

5. The apparatus of claim 1, wherein the channel list comprises an electronic program guide (EPG) presented on the display device, and the instructions are executable to cause the second tuner to tune to the second DTV channel before a listing for the second DTV channel is visible on the EPG or before the next channel in the EPG is selected.

6. The apparatus of claim 1, wherein the instructions are executable to:
input the CBS to at least one machine learning (ML) model; and
cause the second tuner to tune to the second DTV channel based on output from the ML model.

7. The apparatus of claim 6, wherein the instructions are executable to:
train the ML model using the CBS.

8. An apparatus comprising:
at least one processor assembly configured to:
use a first tuner to present a first digital television (DTV) channel on at least one display device;
present a channel list on the display device;
receive channel browsing signals to navigate the channel list;
use a second tuner to tune to a second DTV channel responsive to the CBS prior to receiving a channel change command to the second DTV channel;
responsive to receiving the channel change command, present the second DTV channel on the display device using the second tuner;
while the second DTV channel is presented on the display device using the second tuner, use the first tuner to also tune to the second DTV channel; and
responsive to the first tuner also tuning to the second DTV channel, switch to presenting the second DTV channel on the display device using the first tuner.

9. The apparatus of claim 8, comprising an input device from whence the CBS are received, wherein the input device comprises a television remote control (RC).

10. The apparatus of claim 8, wherein the display device comprises an Advanced Television Systems Committee (ATSC) 3.0 DTV.

11. The apparatus of claim 8, wherein the display device comprises a chassis holding a display, and the first tuner is in the chassis and the second tuner is embodied in a dongle plugged into an external port of the chassis.

12. The apparatus of claim 8, wherein the processor assembly is configured to:
input the CBS to at least one machine learning (ML) model; and
cause the second tuner to tune to the second DTV channel based on output from the ML model.

13. The apparatus of claim 12, wherein the processor assembly is configured to:
train the ML model using the CBS.

14. A method comprising:
presenting, using a first tuner, a first television (TV) channel on at least one display device;
receiving channel browsing signals (CBS);
navigating a channel list in response to the CBS;
responsive to the CBS, causing a second tuner to tune to a second TV channel;
responsive to a channel change command to the second TV channel, presenting the second TV channel on the display device using the second tuner;
while the second TV channel is presented on the display device using the second tuner, using the first tuner to also tune to the second TV channel; and
responsive to the first tuner also tuning to the second TV channel, switching to presentation of the second TV channel on the display device using the first tuner.

15. The apparatus of claim 1, wherein the instructions are executable to:
prior to the channel change command and while the second tuner is tuned to the second DTV channel, present the second DTV channel in picture-in-picture format on the display device concurrent with presentation of the first DTV channel on the display device.

16. The apparatus of claim 1, wherein the instructions are executable to:
identify, via face recognition, a current user of the display device; and
based on the identification of the current user via face recognition, cause the second tuner to tune to the second DTV channel prior to presenting the second DTV channel on the display device.

17. The apparatus of claim 8, wherein the instructions are executable to:
prior to receiving the channel change command and while the second tuner is tuned to the second DTV channel, present the second DTV channel in picture-in-picture format on the display device concurrent with presentation of the first DTV channel on the display device.

18. The apparatus of claim 8, wherein the instructions are executable to:
identify, via face recognition, a current user of the display device; and
based on the identification of the current user via face recognition, use the second tuner to tune to the second DTV channel prior to presenting the second DTV channel on the display device.

19. The method of claim 14, comprising:
prior to receipt of the channel change command and while the second tuner is tuned to the second TV channel, presenting the second TV channel in picture-and-picture format on the display device concurrent with presentation of the first TV channel on the display device.

20. The method of claim 14, comprising:
identifying, via face recognition, a current user of the display device; and
based on the identification of the current user via face recognition, causing the second tuner to tune to the second TV channel prior to presenting the second TV channel on the display device.

* * * * *